United States Patent
Fujiwara

(10) Patent No.: US 10,638,005 B2
(45) Date of Patent: Apr. 28, 2020

(54) SCANNER AND MULTIFUNCTION DEVICE

(71) Applicant: Brother Kogyo Kabushiki Kaisha, Nagoya (JP)

(72) Inventor: Takashi Fujiwara, Nagakute (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 16/289,730

(22) Filed: Mar. 1, 2019

(65) Prior Publication Data

US 2019/0289151 A1   Sep. 19, 2019

(30) Foreign Application Priority Data

Mar. 16, 2018 (JP) ................. 2018-050204

(51) Int. Cl.
*H04N 1/00* (2006.01)
*H04N 1/12* (2006.01)

(52) U.S. Cl.
CPC ..... *H04N 1/00554* (2013.01); *H04N 1/00037* (2013.01); *H04N 1/0053* (2013.01); *H04N 1/129* (2013.01)

(58) Field of Classification Search
CPC ... B65H 1/04; B65H 1/12; B65H 1/14; B65H 2402/64; B65H 2403/42; B65H 2403/53; B65H 2405/11162; B65H 2405/1117; B65H 2405/11172; B65H 2405/1124; B65H 2405/1134; B65H 2405/324; B65H 2407/21; G03G 15/60; G03G 15/6552; G03G 21/1619; G03G 2215/0021; H04N 1/00559; H04N 1/00795; H04N 1/00811; H04N 1/00814; H04N 1/00824; H04N 1/00925; H04N 1/1017; H04N 1/1035;
(Continued)

(56) References Cited

U.S. PATENT DOCUMENTS

| | | | |
|---|---|---|---|
| 4,990,951 A * | 2/1991 | Sanbayashi | G03B 21/118 355/40 |
| 5,126,789 A * | 6/1992 | Fukuchi | G03G 21/1853 271/162 |

(Continued)

FOREIGN PATENT DOCUMENTS

| | | |
|---|---|---|
| JP | 2001-296709 A | 10/2001 |
| JP | 2005-084061 A | 3/2005 |

(Continued)

*Primary Examiner* — Negussie Worku
(74) *Attorney, Agent, or Firm* — Burr & Brown, PLLC

(57) ABSTRACT

In a scanner, a document cover is pivotable about a pivot axis between a closed position to cover the document table and an open position to expose the document table. An operation panel is movable between a first position and a second position lower than the first position. The operation panel in the first position overlaps with the document cover in the closed position when viewed in a perpendicular direction to the pivot axis of the document cover. The document cover is away from the operation panel in the perpendicular direction. The moving mechanism is configured to move the operation panel to the second position in response to pivoting of the document cover to the open position, and to move the operation panel to the first position in response to the pivoting of the document cover to the closed position.

16 Claims, 11 Drawing Sheets

(58) Field of Classification Search
CPC ...... H04N 1/12; H04N 1/193; H04N 1/32133; H04N 1/60; H04N 2201/0081; H04N 2201/0094; H04N 2201/0098; H04N 2201/02404; H04N 2201/0442; H04N 2201/0446; H04N 2201/3242; H04N 2201/3269; H04N 2201/3271
See application file for complete search history.

(56) References Cited

U.S. PATENT DOCUMENTS

| | | | |
|---|---|---|---|
| 2011/0176182 A1* | 7/2011 | Otsuki | H04N 1/00559 358/474 |
| 2012/0026358 A1* | 2/2012 | Hirose | G02B 7/28 348/226.1 |
| 2012/0236340 A1* | 9/2012 | Tsuduki | H04N 1/00493 358/1.12 |
| 2014/0092450 A1* | 4/2014 | Sato | H04N 1/00496 358/498 |
| 2015/0001788 A1* | 1/2015 | Aoki | B65H 1/12 271/147 |
| 2016/0309046 A1* | 10/2016 | Xie | H04N 1/0032 |
| 2018/0259883 A1* | 9/2018 | Takano | G03G 15/16 |
| 2019/0007562 A1* | 1/2019 | Sato | H04N 1/00037 |
| 2019/0238698 A1* | 8/2019 | Fujiwara | H04N 1/00588 |
| 2019/0238700 A1* | 8/2019 | Ito | H04N 1/00602 |

FOREIGN PATENT DOCUMENTS

| | | |
|---|---|---|
| JP | 2011-175106 A | 9/2011 |
| JP | 2013-038690 A | 2/2013 |

* cited by examiner

FIG.2
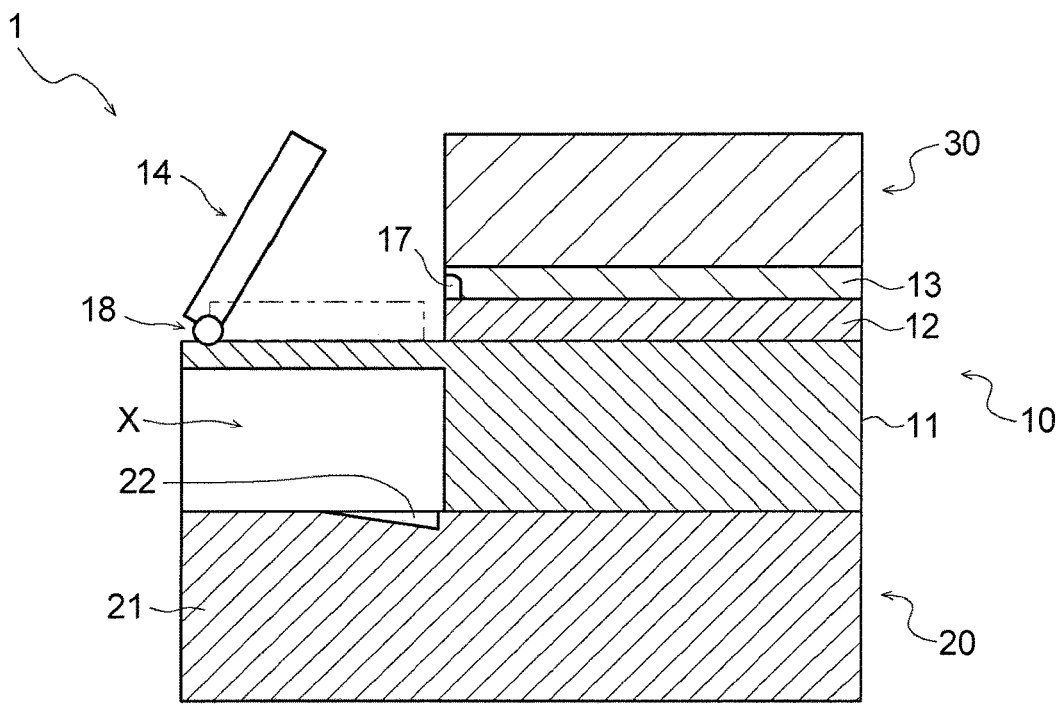
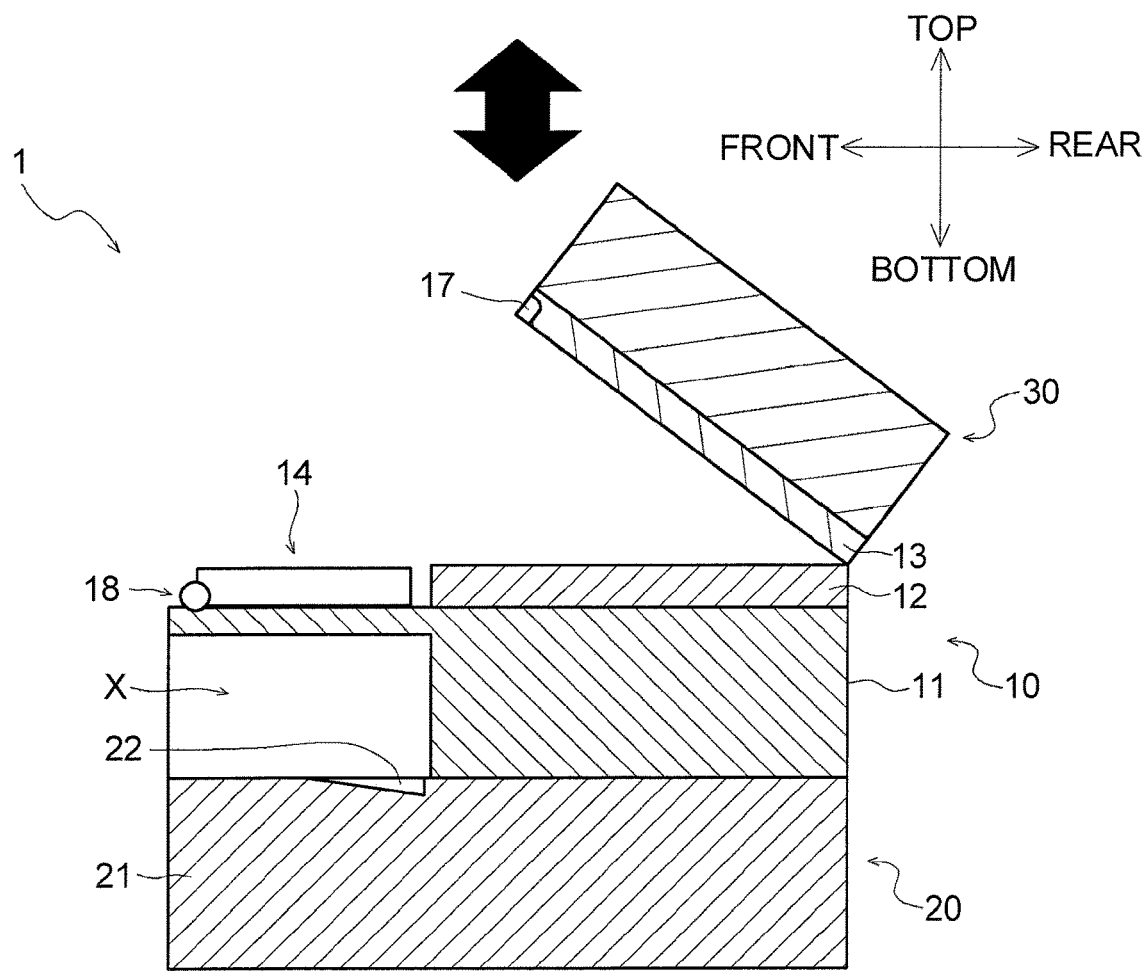

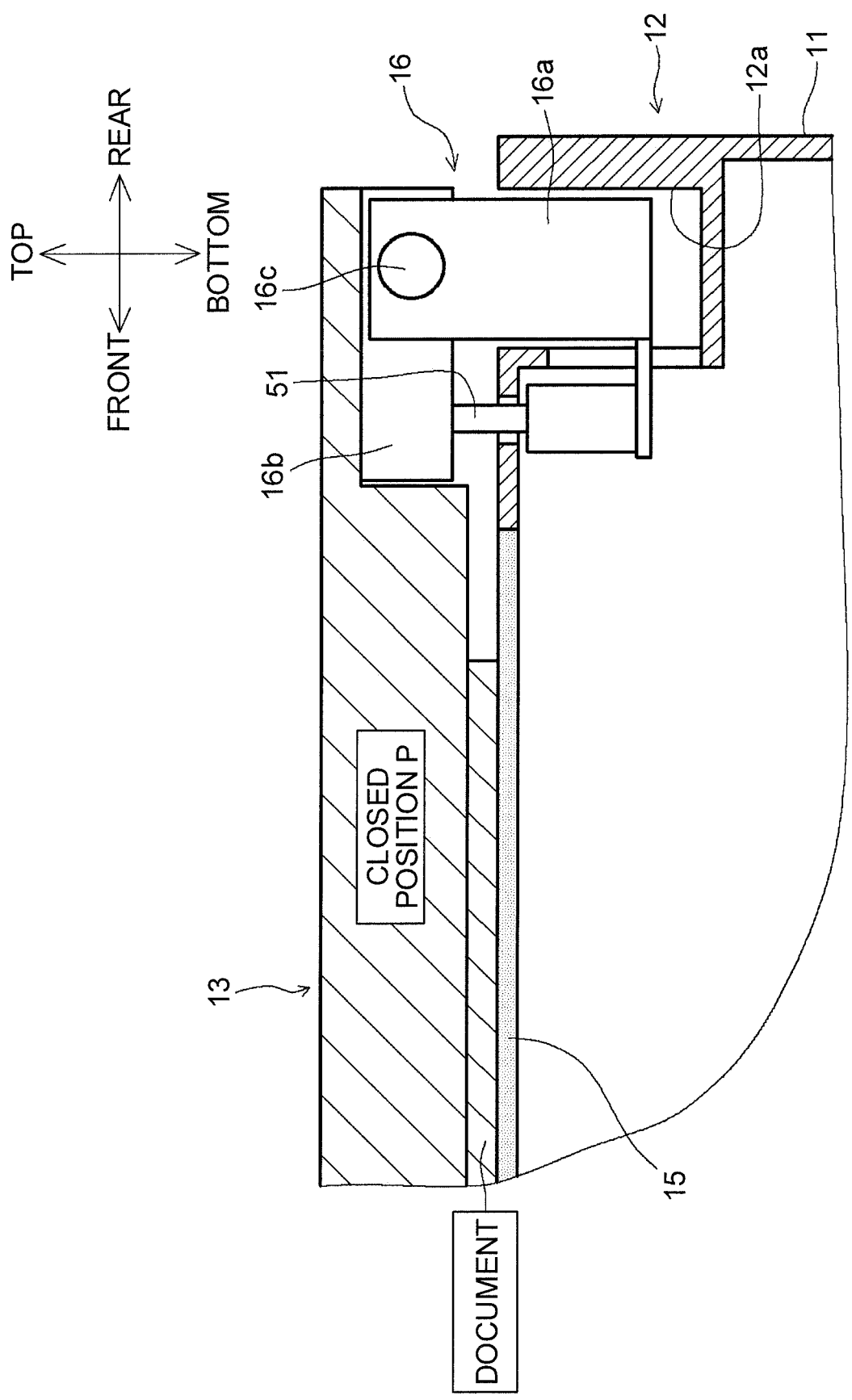

FIG.4
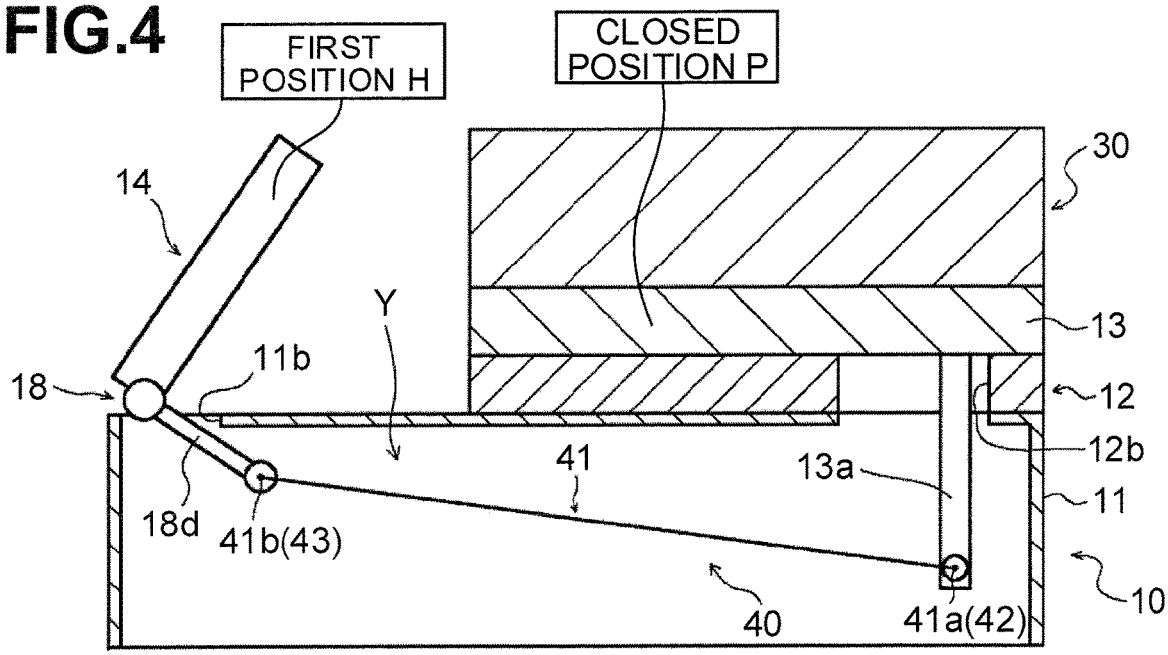
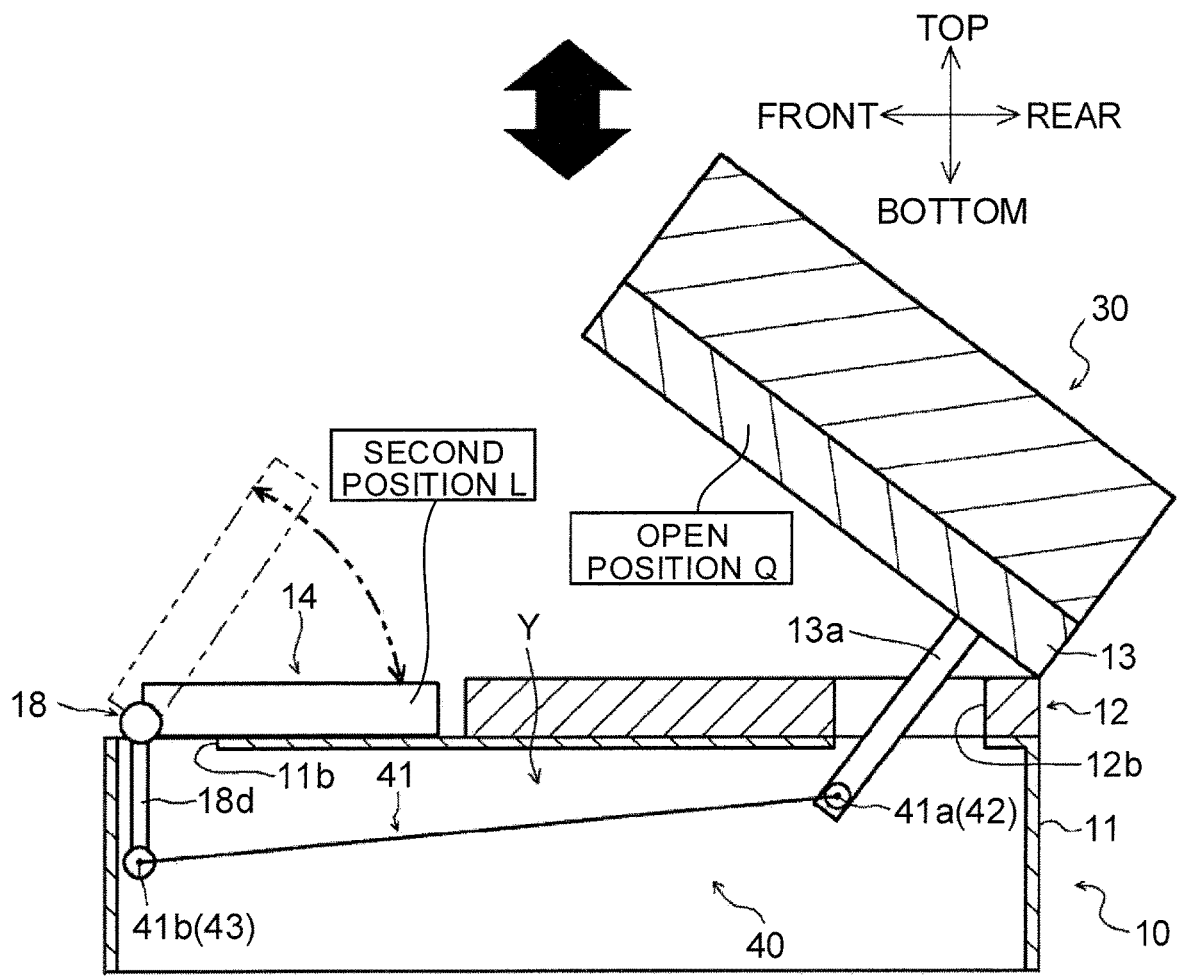

SECTION A-A

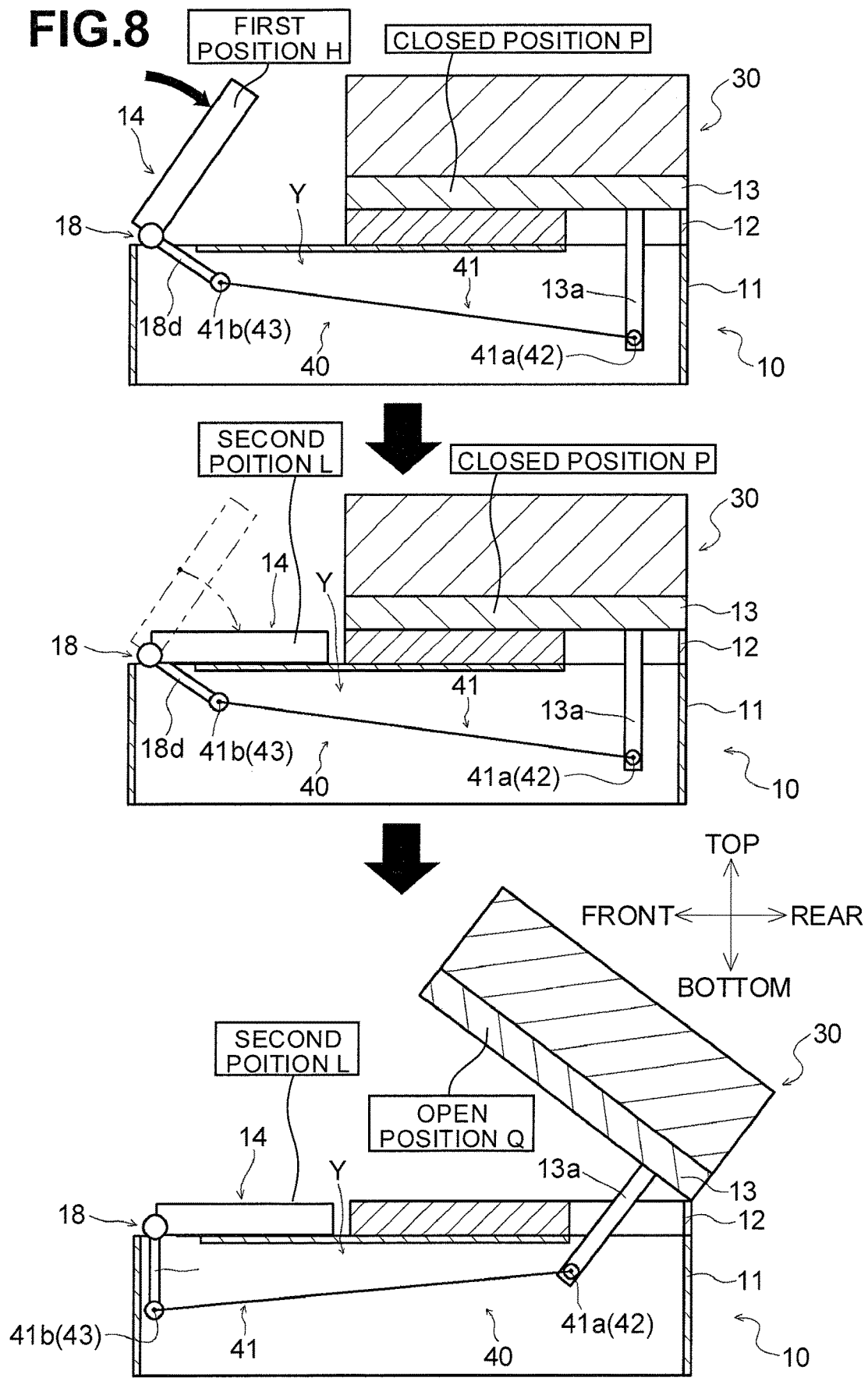

SCANNER AND MULTIFUNCTION DEVICE

CROSS-REFERENCE TO RELATED APPLICATION

This application claims priority from Japanese Patent Application No. 2018-050204 filed on Mar. 16, 2018, the content of which is incorporated herein by reference in its entirety.

FIELD OF DISCLOSURE

The disclosure relates to a scanner including a document table, a document cover, and an operation pane, and also relates to a multifunction device including the scanner and a printer.

BACKGROUND

A known flatbed scanner includes a document table and an operation panel with which the scanner is operated and which is pivotable upwardly above the document table. The operation panel is storable and changeable in its inclination angle depending on the user's usage.

SUMMARY

However, the operation panel, which stands up above the document table, might be an obstacle for the user to lift the documents table and set a document to be scanned on the document table.

It may be beneficial for a scanner, either standalone or belonging to a multifunction device, to include an operation panel movable upwardly above a document table while providing an improved workability for document setting.

According to one or more aspects of the disclosure, a scanner comprises a document table, a housing covering a side surface of the document table, a document cover, an operational panel through which operational commands are input, and a moving mechanism. The document cover is pivotable about a pivot axis between a closed position to cover the document table and an open position to expose the document table. The operation panel is movable between a first position and a second position lower than the first position. The operation panel in the first position overlaps with the document cover in the closed position when viewed in a perpendicular direction to the pivot axis of the document cover. The document cover is away from the operation panel in the perpendicular direction. The moving mechanism is configured to move the operation panel to the second position in response to pivoting of the document cover to the open position, and to move the operation panel to the first position in response to the pivoting of the document cover to the closed position.

According to one or more aspects of the disclosure, a multifunction device comprises the above-described scanner, and a printer disposed below the scanner to define a space therebetween. The printer includes a sheet discharge tray disposed on an upper surface of the printer. The operation panel is disposed above the sheet discharge tray.

BRIEF DESCRIPTION OF THE DRAWINGS

Aspects of the disclosure are illustrated by way of example and not by limitation in the accompanying figures in which like reference characters indicate similar elements.

FIG. 2 is a schematic cross-sectional right side view of the multifunction device.

FIG. 3B is a schematic partial cross-sectional right side view of the multifunction device, showing the document cover hinge and a limit switch which are shifted.

FIG. 4 is a schematic partial cross-sectional right side view of the document cover and an operation panel which are linked to each other.

FIG. 8 is a schematic partial cross-sectional right side view of a torque hinge.

DETAILED DESCRIPTION

An embodiment according to one or more aspects of the disclosure will be described below.

Overall Structure of Multifunction Device

Figure 1:
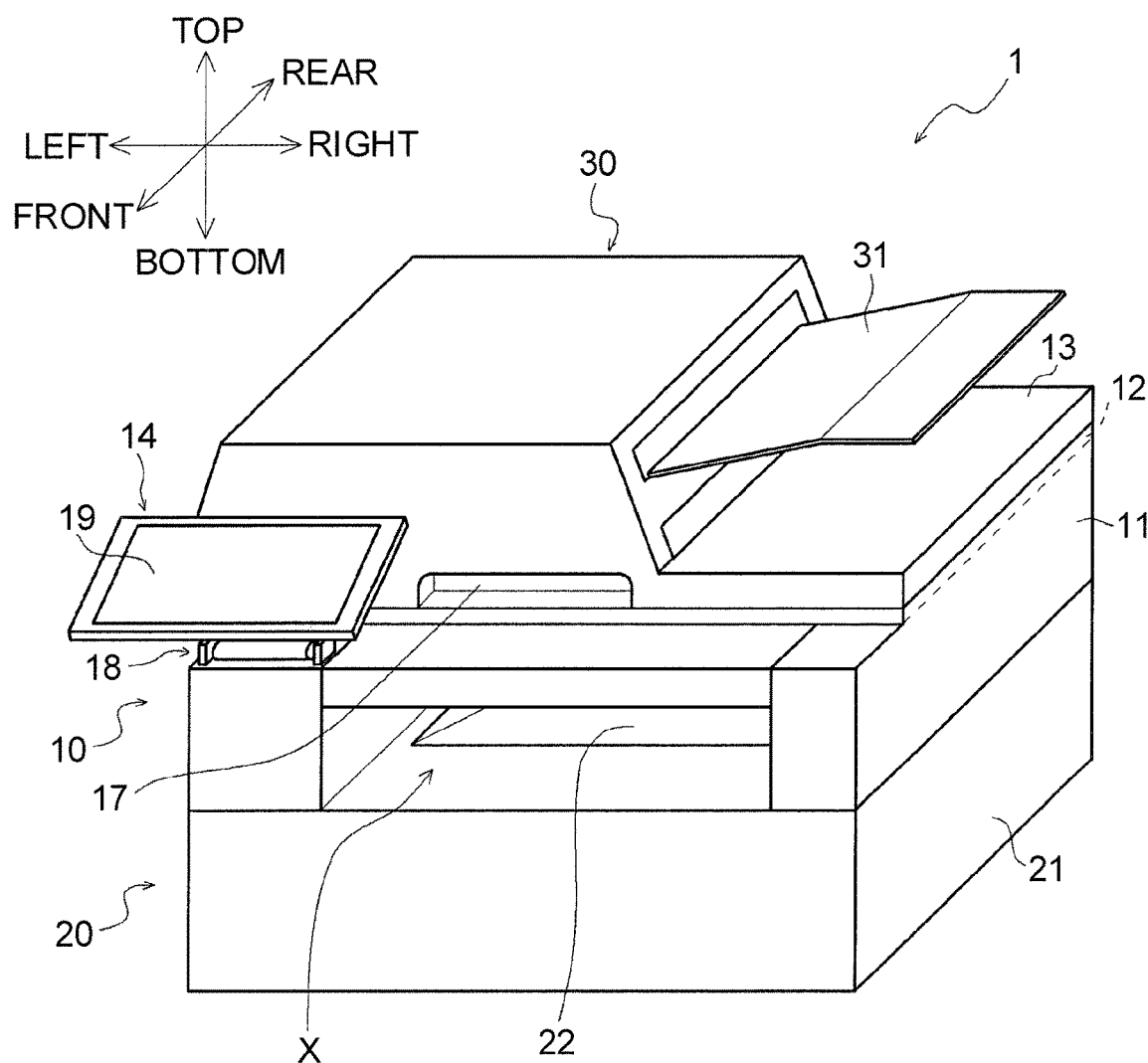
FIG. 1 is a schematic perspective view of a multifunction device in an embodiment according to one or more aspects of the disclosure.

A multifunction device according to an embodiment will be described with reference to the drawings. Front-rear, right-left, and top-bottom directions are defined with reference to an orientation of a multifunction device 1 that may be disposed in an orientation in which it may be intended to be used (refer to FIG. 1). The directions defined in FIG. 1 are applied to other figures. As shown in FIG. 1, the multifunction device 1 according to one or more aspects of the disclosure has multiple functions, such as copying, scanning, and printing, and includes a scanner 10 and a printer 20. In the multifunction device 1, the scanner 10 has a space X, and the printer 20 is disposed below the space X. The space X is open to the front and bottom of the scanner 10. A sheet discharge tray 22 disposed on an upper surface of the printer 20 is visible when the space X is viewed from the front.

Structure of Scanner

As shown in FIGS. 1 and 2, the scanner 10 is configured to read image information from a document and includes a housing 11, a document table 12, a document cover 13, and an operation panel 14. The housing 11 is an external box-shaped casing of the scanner 10 and encloses therein an optical scanning sensor (not shown).

Structure of Document Table

The document table 12, disposed at an upper end of the housing 11, is a so-called flatbed on which a document is placed. Front, rear, right, and left sides of the document table 12 are covered by the housing 11. A flat transparent glass 15 (shown in FIG. 3) is disposed on the document table 12. The optical scanning sensor irradiates from below a document on the glass 15, and receives a reflected light.

Structure of Document Cover

The document cover 13 is disposed above the document table 12. The document cover 13 presses from above a document on the glass 15 of the document table 12 to darken a surrounding area of the document. The document cover 13 is secured to the document table 12 by way of a pair of document cover hinges 16 (shown in FIG. 3) which are arranged in the right-left direction.

The document cover includes a handle 17 at its front central portion. The handle 17 is a recess to be grabbed by a user to pivotally open and close the document cover 13.

Figure 3A:
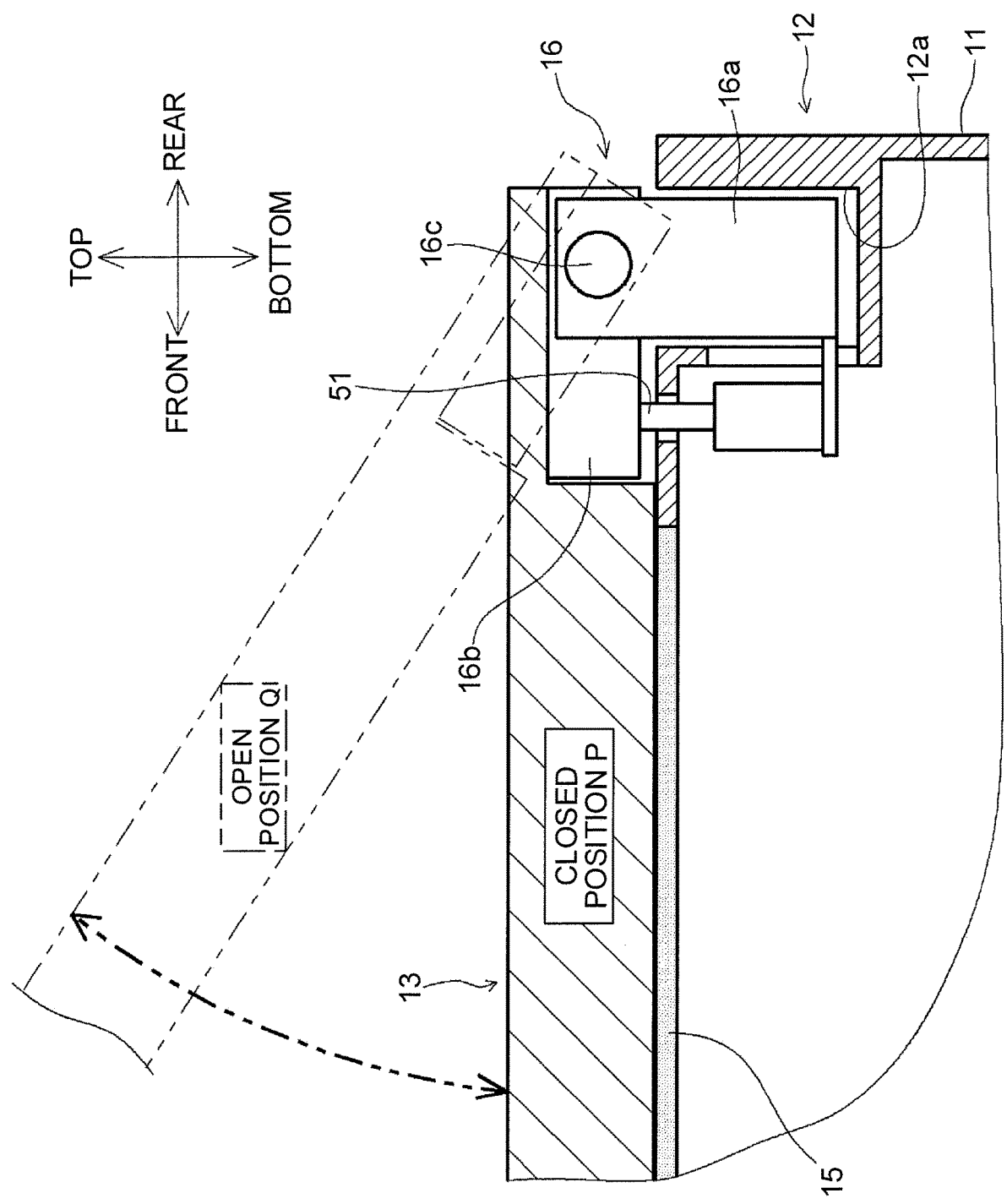
FIG. 3A is a schematic partial cross-sectional right side view of the multifunction device, showing a document cover and a document cover hinge, where the document cover is open and closed.

As shown in FIGS. 3A and 3B, the document cover 13 is pivotably secured to the document table 12 by way of each document cover hinge 16. The document cover hinge 16 includes a support member 16a, a pivoting member 16b, and a shaft member 16c. The pivoting member 16b supports the document cover 13. The pivoting member 16b is supported by the shaft member 16c pivotably relative to the support member 16a.

Figure 5:
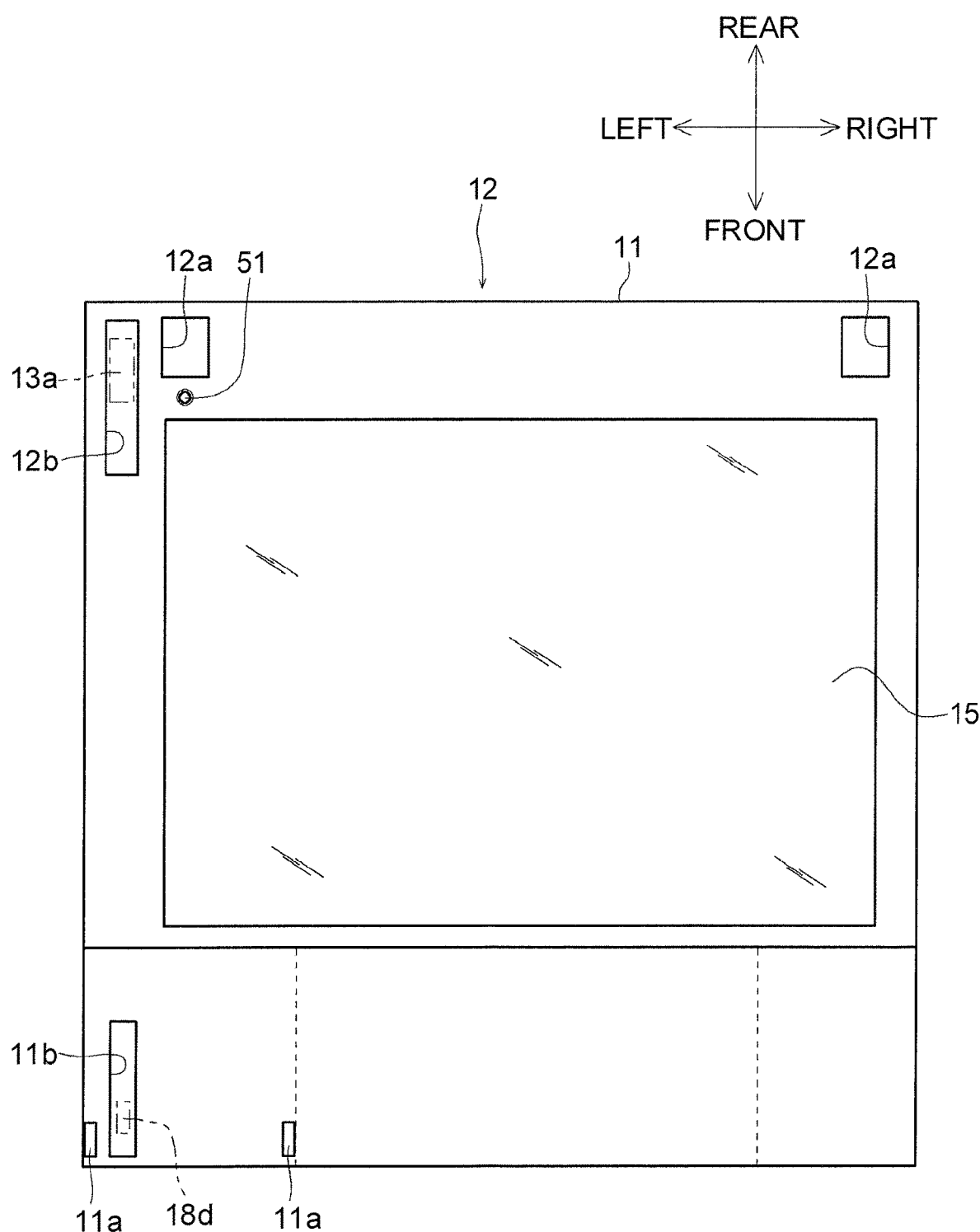
FIG. 5 is a schematic plan view of a document table.

As shown in FIG. 5, the document table 12 has, in its upper surface, recesses 12a for positioning the document cover hinges 16. As shown in FIGS. 3A and 3B, each document cover hinge 16 is fitted in the corresponding recess 12 such that a pivot axis of the respective shaft member 16c is oriented in the right-left direction of the multifunction device 1. The document cover 13 thus structured is pivotable about the pivot axis of the document cover hinges 16 between a closed position P and an open position Q. To simplify the drawings, the document cover hinges 16 are omitted from FIGS. 2, 4, and 8. The structure of the document cover hinge 16 of the scanner 10 is not limited to that shown in this embodiment.

As shown in FIG. 4, the document cover 13 includes an arm 13a. The arm 13a connects the document cover 13 to a moving mechanism 40 to be described later. The arm 13a protrudes from a lower surface of the document cover 13. The arm 13a is inserted, through an opening 12b in an upper surface of the document table 12, into a space Y inside the housing 11. The arm 13a is long enough to reach deep in the space Y. The arm 13a is movable inside the space Y in response to pivoting of the document cover 13. The moving mechanism 40 to be described later is stored in the space Y.

Pivoting Positions of Document Cover

As shown in FIGS. 3A and 3B, the document cover 13 is configured to pivot between a closed position P and an open position Q. The document cover 13, when in the closed position, covers an upper surface of the document placement glass 15 on the document table 12 and, when in the open position, exposes the upper surface of the glass 15. As shown in FIG. 3B, the document cover 13 is movable in the top-bottom direction along the recess 12a for the hinge 16. The document cover 13 in the closed position P is shifted vertically by a thick document to be scanned.

Structure of Operation Panel

As shown in FIGS. 1 and 2, the operation panel 14 is operated by a user to input various commands to the multifunction device 1. The operation panel 14 includes a touch panel 19 served as display means (e.g. a display) and operation means (e.g., operation switches). The operation panel 14 is disposed at a front left portion of the multifunction device 1. A user accesses to the multifunction device 1 from the front.

The touch panel 19 as operation means displays, on its screen, a plurality of operation buttons including numeric keys for entry of numeric values, and allows a user to input information for setting, for example, the number of copies to be printed, the size and number of sheets. The touch panel 19 as display means displays thereon the settings and operation states of the multifunction device 1.

Figure 6A:
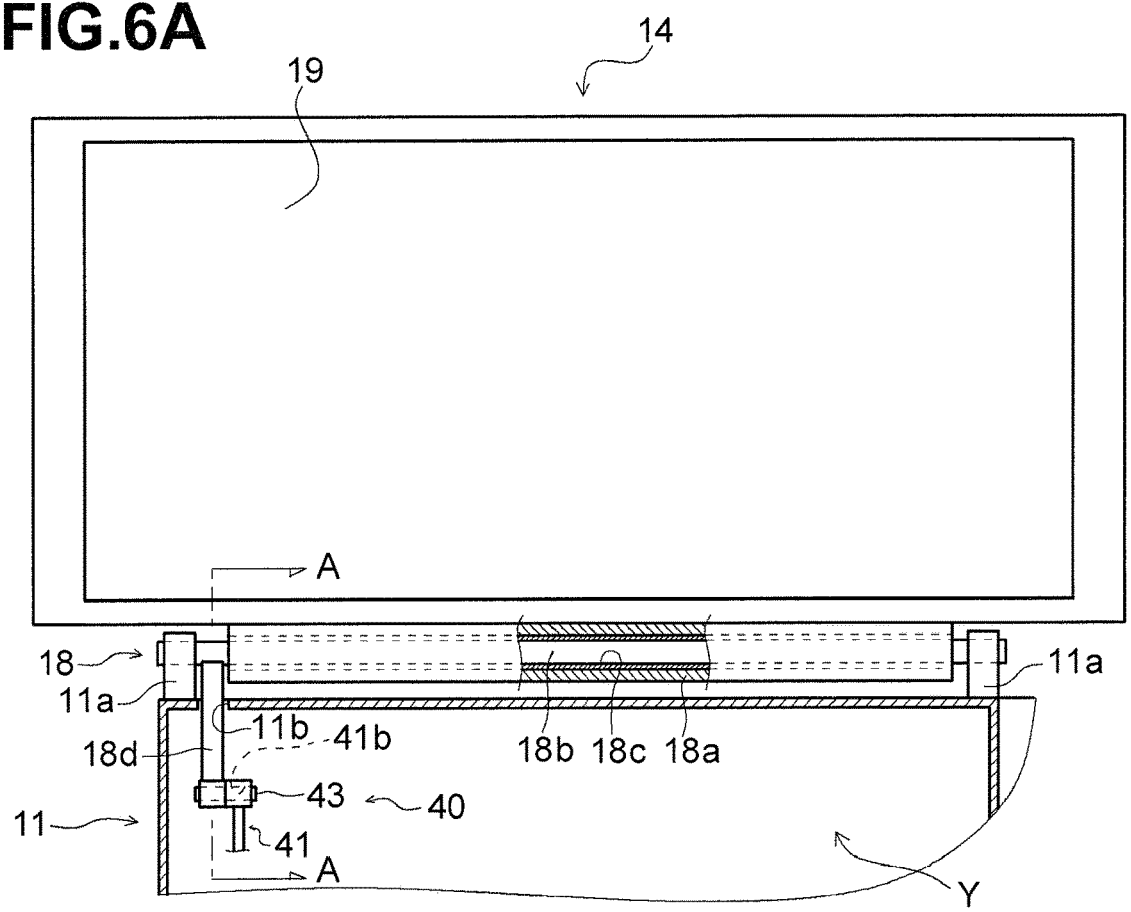
FIG. 6A is a schematic partial front view of the operation panel.

As shown in FIG. 6A, the operation panel 14 is pivotably attached to stays 11a by way of panel hinges 18. In the multifunction device 1, the operation panel 14 is mounted to the scanner 10.

Structure of Panel Hinge

Figure 6B:
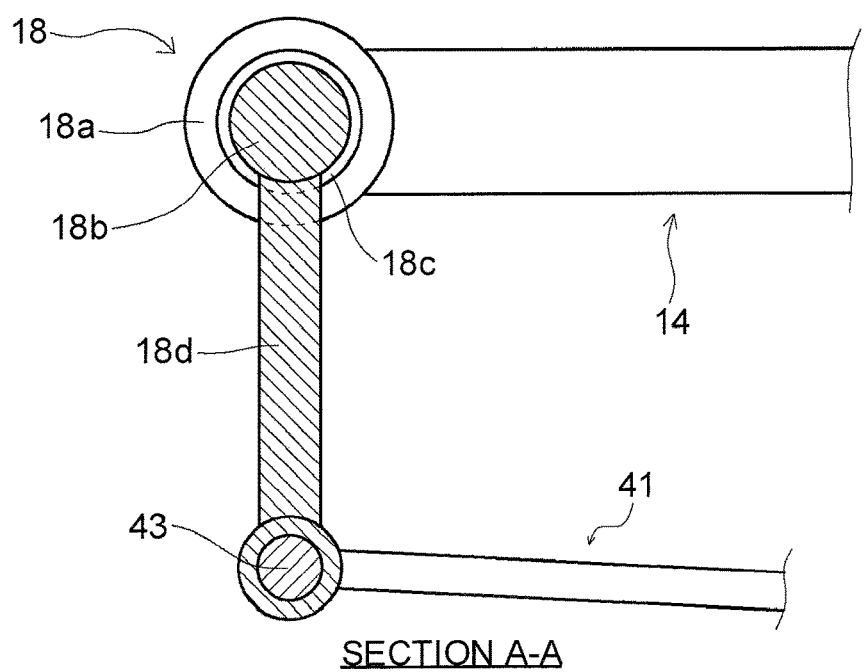
FIG. 6B is a cross-sectional view of the operation panel taken along line A-A of FIG. 6A.

As shown in FIGS. 6A and 6B, a panel hinge 18 includes a pivot base 18a, a pivot shaft 18b, and a friction member 18c. The pivot base 18a, which is a cylindrical member, is attached to a lower end of the operation panel 14. The pivot shaft 18b, which is a shaft for pivotably supporting the pivot base 18a, is inserted through the pivot base 18a. The friction member 18c is disposed between an inner circumferential surface of the pivot base 18a and an outer circumferential surface of the pivot shaft 18b.

In a case where, when the pivot shaft 18b rotates, a torque about the pivot shaft 18b of a predetermined value or less acts on the pivot base 18a, the pivot base 18a rotates together with the pivot shaft 18b because of frictional forces exerted between the pivot base 18a and the frictional member 18c and between the pivot shaft 18b and the frictional member 18c. In contrast, in a case where, when the pivot shaft 18b rotates, a torque about the pivot shaft 18b greater than the predetermined value acts on the pivot base 18a, slippage occurs between the pivot base 18a and the frictional member 18c or between the pivot shaft 18b and the frictional member 18c, thereby allowing the pivot base 18a and the pivot shaft 18b to rotate relative to each other. In other words, the panel hinge 18 is configured to be a so-called torque hinge. The structure of the panel hinge of the scanner 10 is not limited to that shown in this embodiment. The mounting positions of the stays 11a and the structure of the torque hinge may be changed as required.

The panel hinge 18 further includes an arm 18d. The arm 18d is connected to the moving mechanism 40 to be described later and protrudes from the pivot shaft 18b in a direction perpendicular to an axis of the pivot shaft 18b. The arm 18d is configured to pivot integrally with the pivot shaft 18b. The arm 18d is inserted into the space Y inside the housing 11 through an opening 11b formed in an upper surface of the housing 11. The arm 18d is configured to move in the space Y in response to rotation of the pivot shaft 18b. In other words, the pivot shaft 18b of the panel hinge 18 rotates in response to movement of the arm 18d in the space Y.

Pivoting Positions of Operation Panel

As shown in FIG. 4, the operation panel 14 is configured to pivot between a first position H and a second position L. When viewed from the front, i.e., when viewed in a perpendicular direction to a pivot axis of the document cover 13, the operation panel 14 in the first position H overlaps with the document cover 13 in the closed position P. The second position L is lower than the first position H. By way of example shown in FIG. 4, the operation panel 14 located in the second position L contacts the housing 11 and is unable to pivot further downwardly. However, as long as the second position L is lower than the first position H, the operation panel 14 in the second position L may overlap with the document cover 13 in the closed position P when viewed from the front.

Structure of Automatic Document Feeder

As shown in FIGS. 1 and 2, an automatic document feeder (ADF) 30 sequentially feeds documents to the scanner 10. The ADF 30 is disposed on the top left of the document cover 13 and is formed integrally with the document cover 13. The ADF 30 feeds documents from its document tray 31 on which a stack of sheets are placed. The document tray 31 extends rightwardly from a right side surface of the ADF 30 disposed on the left side of the document cover 13.

Structure of Printer

As shown in FIGS. 1 and 2, the printer 20 prints an image on a sheet based on image data read by the scanner 10. The printer 20 is disposed below the scanner 10. The printer 20 includes a rectangular parallelepiped housing 21 which encloses therein an image forming unit (not shown) and a circuit board (not shown). The image forming unit includes a photosensitive body, a charger, an exposure unit, a transfer unit, and a fixer. The printer 20 includes a sheet discharge tray 22 onto which the printer 20 discharges a sheet. The printer 20 discharges a sheet into the space X defined by the sheet discharge tray 22. A user can access, from the front of the multifunction device 1, to the sheet discharge tray 22 to take out a sheet discharge by the printer 20.

Position of Operation Panel

Figure 7A:
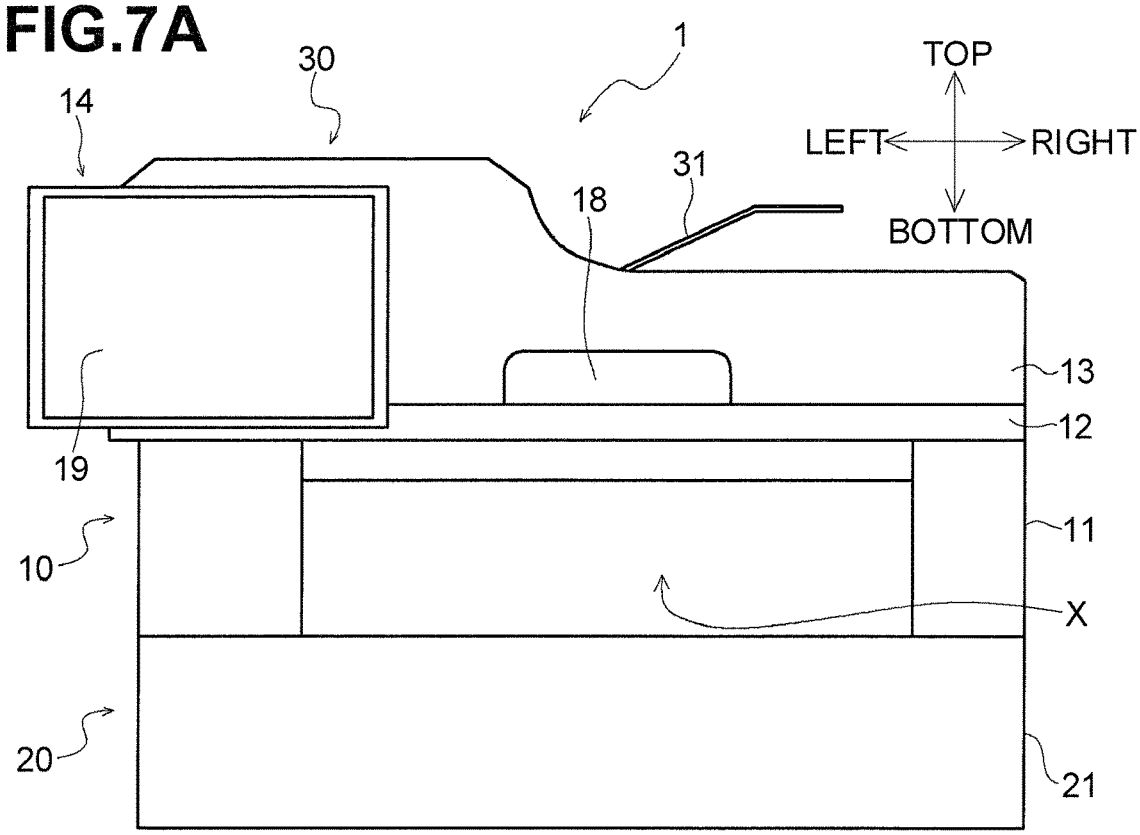
FIG. 7A is a schematic front view of the operation panel, a handle, and a document tray where the operation panel and a space for discharged sheets are partially offset from each other in a parallel direction to a pivot axis of the document cover hinge.
Figure 7B:
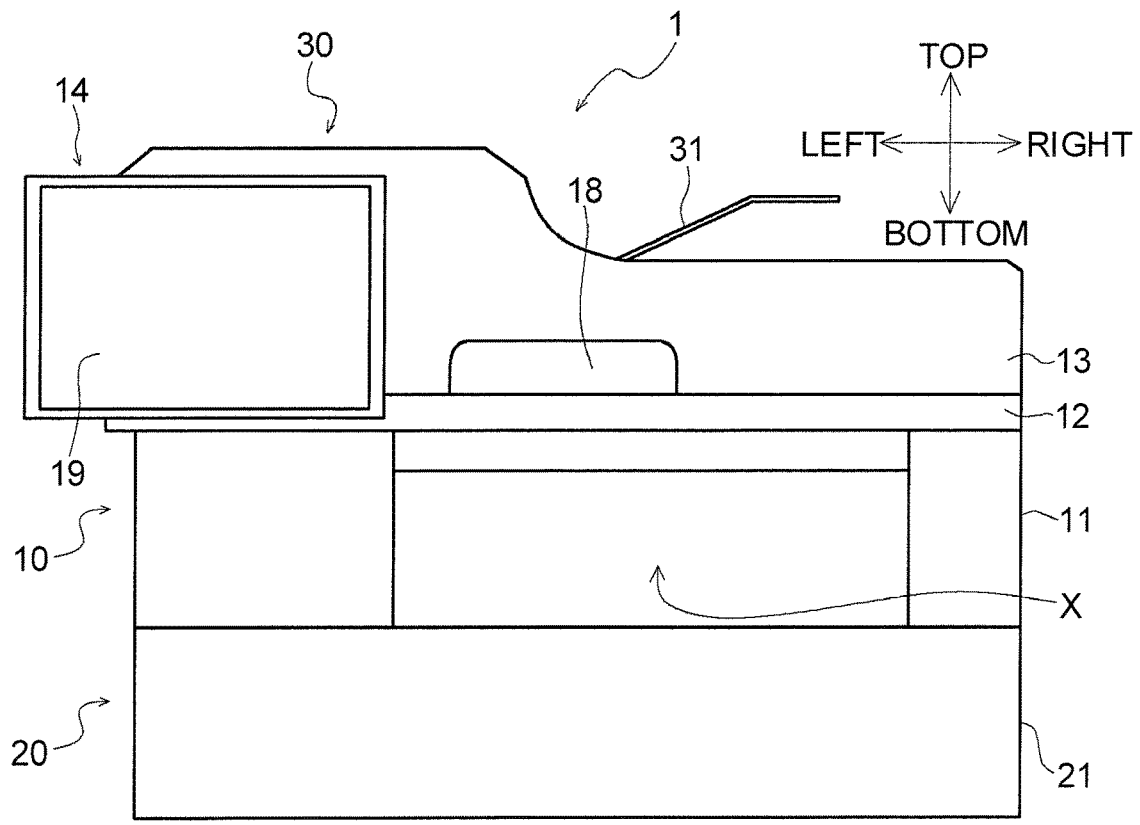
FIG. 7B is a schematic front view of the operation panel, the handle, and the document tray where the operation panel and the space for discharged sheets are entirely offset from each other in the parallel direction to the pivot axis of the document cover hinge.

As shown in FIGS. 7A and 7B, the operation panel 14 is entirely offset from the handle 17 in the right-left direction parallel to the pivot axis of the document cover 13. Thus, the operation panel 14 is disposed such a position that the operation panel 14, even standing up in the first position, will not interfere with a user in grabbing the handle 17 to open and close the document cover 13. This structure provides an improved workability for the user to set a document on the document table 12.

Also, the operation panel 14 is entirely offset from the document tray 31 in the right-left direction parallel to the pivot axis of the document cover 13. Thus, the operation panel 14 is unlikely to interfere with the user in setting documents on the document tray 31. This structure provides an improved workability for the user to set documents on the document tray 31.

In the multifunction device 1, the operation panel 14 is disposed at the housing 11 of the scanner 10. The operation panel 14 thus disposed is unlikely to interfere with the user in taking out a discharged sheet in the multifunction device 1 in which the space X is defined blow the scanner 10 and the sheet discharge tray 22 is disposed above the printer 20. The multifunction device 1 includes the scanner 10 with the operation panel 14, and the printer 20. The operation panel 14 is disposed so as not to overlap with the printer 20 when viewed from the front. This ensures easy access to a sheet discharged on the sheet discharge tray 22 of the printer 20.

As shown in FIG. 7B, the operation panel 14 may be entirely offset from the space X in the right-left direction parallel to the pivot axis of the document cover 13. In this case, a lower end of the operation panel 14 may be below an upper end of the space X.

Moving Mechanism

The scanner 10 includes the moving mechanism 40 shown in FIG. 4. The moving mechanism 40 pivots the operation panel 14 in response to the document cover 13 which is pivotally opened and closed. The moving mechanism 40 includes a link member 41, a first shaft 42, and a second shaft 43, and links the arm 13a of the document cover 13 and the arm 18d of the panel hinge 18.

The link member 14 is rod-shaped and has a first shaft hole 41a at its one end, and a second shaft hole 41b at its other end. The first shaft 42 is supported, via a bearing (not shown), in the first shaft hole 41a of the link member 41, and the second shaft 43 is supported, via a bearing (not shown), in the second shaft hole 41b. The first shaft 42 supports the arm 13a of the document cover 13 such that the first shaft 42 and the arm 13a rotate relative to each other. The second shaft 43 supports the arm 18d of the panel hinge 18 such that the second shaft 43 and the arm 18d rotate relative to each other. In this way, the link member 41, the first shaft 42, and the second shaft 43 link the arm 13a of the document cover 13 and the arm 18d of the panel hinge 18.

Action of Moving Mechanism

As shown in FIG. 4, when a user pivots the document cover 13 between the closed position P and the open position Q, the moving mechanism 40 causes the arm 13a to move, inside the housing 11, arcuately about the pivot axis of the document cover hinge 16 in response to the position of the pivoted document cover 13. In this case, the first shaft 42 moves in response to the position of the pivoted document cover 13, thereby moving the link member 41. The link member 41 has a predetermined length such that the second shaft 43 moves as the first shaft 42 moves in response to the position of the pivoted document cover 13. As the second shaft 43 moves, the arm 18d pivots about the pivot shaft 18b. This causes the operation panel 14 connected to the pivot base 19a to pivot.

Specifically, in the scanner 10, pivoting the document cover 13 to the closed position P causes the operation panel 14 to pivot to the first position H, and pivoting the document cover 13 to the open position Q causes the operation panel 14 to pivot to the second position L.

In short, in the scanner 10, the moving mechanism 40 is configured to pivot the operation panel 14 in response to pivoting by the user of the document cover 13. In the scanner 10 thus structured, the moving mechanism 40 retracts the operation panel 14, which is movable upwardly above the document table 12, to the second position L when the document cover 13 is pivoted to the open position Q. When the user sets a document on the document table 12, the operation panel 14 is retracted from the position which might interfere with the user, thereby facilitating document setting. Although the link member 41, which is a mechanical structure, is readily made and preferable for the moving mechanism 40, other structures may be adopted. For example, an actuator, a drive source, e.g., a motor, and a sensor may be used in combination.

Action of Panel Hinge

As shown in FIG. 8, in the scanner 10, the moving mechanism 40 pivots the operation panel 14 to the first position H in response to pivoting by the user of the document cover 13 to the closed position P. In this case, the operation panel 14, which stands up in the first position H, might be an obstacle to a user. A torque hinge is used for the panel hinge 18 in the scanner 10. This allows the user to pivot the operation panel 14 independently, by pushing the operation panel 14. The user can pivot the operation panel 14 to the second position L while the document cover 13 is maintained closed. In the scanner 10 and in the multifunction device 1 including the scanner 10, the user is allowed to tilt down the operation panel 14 from the first position H (i.e. from the standing position) independently from the document cover 13. This structure provides an improved workability for the user.

When the user pivots the document cover 13 to the open position Q in a state where the document cover 13 is in the closed position P and the operation panel 14 is in the second position L, the operation panel 14 is maintained, by the panel hinge 18, in the second position L. When the user pivots the document cover 13 to the open position Q after pivoting the operation panel 14 to the second position L independently, the moving mechanism 40 returns to its normal operable state.

Disabling Panel Operation

Figure 9:
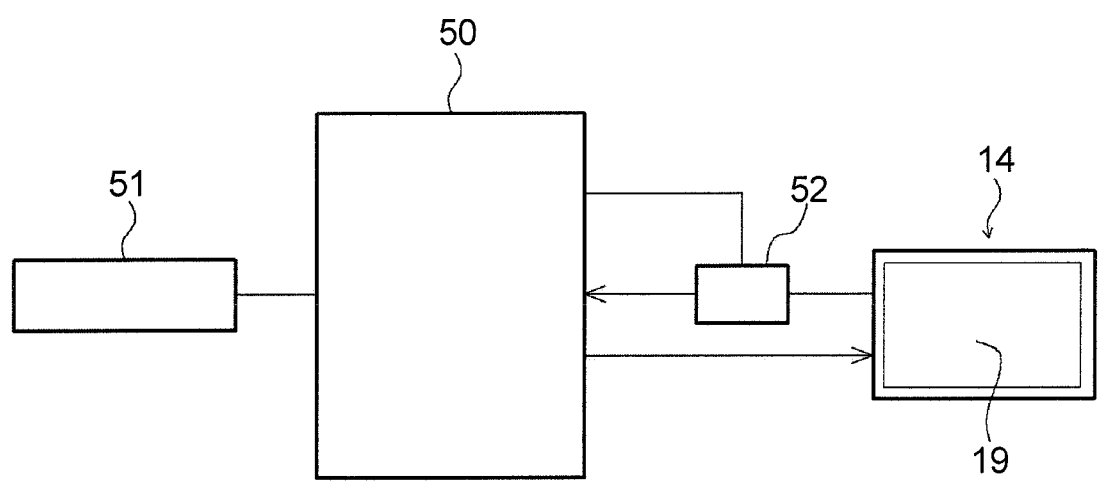
FIG. 9 is a block diagram of a controller of a scanner of the multifunction device.

In the scanner 10, input from the operation panel 14 is disabled when the document cover 13 is in the open position Q. As shown in FIG. 9, the scanner 10 includes a controller 50, a limit switch 51, and a changeover switch 52.

The controller 50 controls action of the scanner 10. The controller 50 is enclosed in the housing 11 (although omitted from the drawings). As shown in FIG. 5, the limit switch 51 is exposed to the upper surface of the document table 12. As shown in FIGS. 3A and 3B, the limit switch 51 is fixed to the support member 16a of the document cover hinge 16 so as to move vertically as the document cover hinge 16 moves vertically. The limit switch 51 thus structured detects open and closed states of the document cover 13 regardless of the thickness of a document. The changeover switch 52 is disposed in a circuit for sending output signals from the operation panel 14 to the controller 50, and turns on and off in response to commands from the controller 50. A controller for controlling the scanner 10 is not limited to the controller 50 shown in this embodiment and may be changed as required. The limit switch 51 may be replaced by an optical sensor, or the controller 50 may have a function served as the changeover switch 51.

As shown in FIGS. 3A and 3B, when the document cover 13 is in the closed position P, the limit switch 51 is pressed down by the document cover 13 so as not to protrude, from the upper surface of the document table 12, upwardly beyond a limit. When the limit switch 51 is pressed down, the controller 50 determines that the document cover 13 is in the closed position P. When the document cover 13 is in the open position Q, the limit switch 51 protrudes, from the upper surface of the document table 12, upwardly beyond the limit. In this case, the controller 50 determines that the document cover 13 is in the open position Q.

In the scanner 10, the controller 50 is configured to enable and disable input from the operation panel 14, based on detection information of the limit switch 51.

Figure 10:
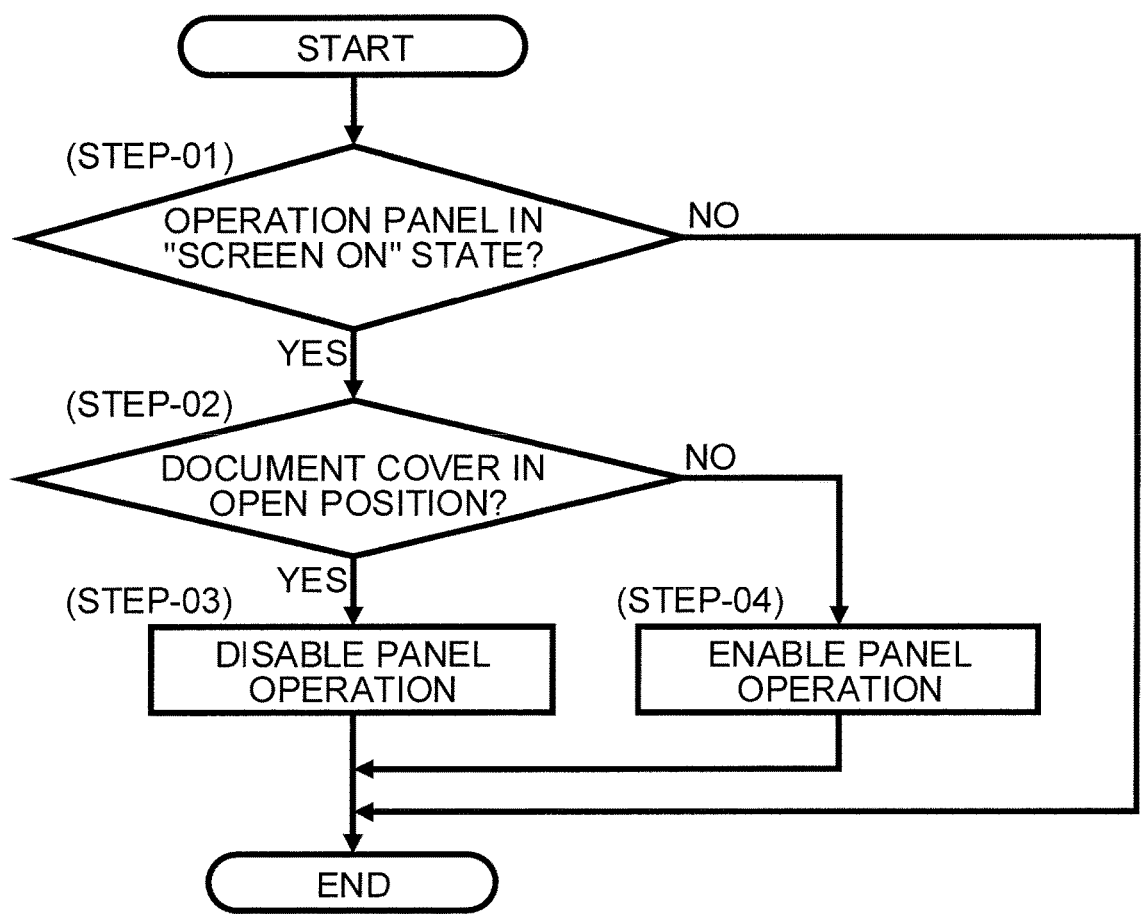
FIG. 10 is a flowchart showing a control process for disabling the operation panel of the scanner.

As shown in FIG. 10, which illustrates the control process for disabling operation from the operation panel 14 in the scanner 10, the controller 10 determines in STEP-01 whether the operation panel 14 is in a "screen ON" state or in a "screen OFF" state. The "screen ON" state herein refers to a state where a plurality of operation buttons such as numeric keys and information about operation states are displayed on the touch panel 19. The "screen OFF" state refers to a state where nothing is displayed on the touch panel 19, as in a sleep state. The controller 50 executes the operation panel disabling control repeatedly at predetermined intervals, e.g., at intervals of one second. If the operation panel 14 is in the "screen ON" state (STEP-01: YES), the control process goes to the next step. If the operation panel 14 is in the "screen OFF" state (STEP-01: NO), the controller 50 determines that the operation panel disabling control is not necessary. This is because the touch panel 19 does not react to any user's unintentional touch thereon when the operation panel 14 is in the "screen OFF" state. Thereafter the control process is ended.

In STEP-02, the controller 50 determines whether the document cover 13 is in the open position Q, based on detection information of the limit switch 51. If the document cover 13 is in the open position Q (STEP-02: YES), the controller 50 disables operation from the touch panel 19 in STEP-03 by setting the changeover switch 52 to block any signal from the touch panel 19. This is because the user is likely to unintentionally touch the operation panel 14 during document setting on the document table 12. Thereafter the control process is ended.

If the document cover 13 is not in the open position Q and is in the closed position P (STEP-02: NO), the controller 50 enables operation from the touch panel 19 in STEP-04 by setting the changeover switch to transmit signals from the operation panel 14 to the controller 50. This is because, when the document cover 13 is in the closed position P, the user is not allowed to set a document on the document table 12 and is unlikely to unintentionally touch the touch panel 19. Thereafter the control process is ended.

In short, in the scanner 10, the controller 50 inhibits input from the touch panel 19 when the document cover 13 is in the open position Q, because it is assumed in this state that the user is setting a document. This control prevents or reduces malfunctions due to the user's unintentional touch, during document setting, on the touch panel 19 of the operation panel 14 which is disposed in front of the document table 12.

Effects of Embodiment

The scanner 10 in the above-described embodiment has advantageous effects described below. The scanner 10 includes the document table 12, the housing 11 covering a side surface of the document table 12, the document cover 13, the operation panel 14 through which operational commands are input, and the moving mechanism 40. The document cover 13 is pivotable about a pivot axis between the closed position P to cover the document table 12 and the open position Q to expose the document table 12. The operation panel 14 is movable between the first position H and the second position L lower than the first position H. The operation panel 14 in the first position H overlaps with the document cover 13 in the closed position P when viewed in a perpendicular direction to the pivot axis of the document cover 13. The document cover 13 is away from the operation panel 14 in the perpendicular direction. The moving mechanism 40 moves the operation panel 14 to the second position L in response to pivoting of the document cover 13 to the open position Q, and moves the operation panel 14 to the first position H in response to the pivoting of the document cover 13 to the closed position P.

In the scanner 10 thus structured, the moving mechanism 40 retracts the operation panel 14, which is movable upwardly above the document table 12, to the second position L when the document cover 13 is pivoted to the open position Q. Thus, when the user sets a document on the document table, the operation panel 14 is retracted from the position which might interfere with the user, thereby facilitating document setting.

In the scanner 10, the document cover 13 includes the handle 17 with which the document cover 13 is opened and closed, and the operation panel 14 is entirely offset from the handle 17 in the direction parallel to the pivot axis of the document cover 13.

In the scanner 10 thus structured, the operation panel 14 is disposed such a position that will not interfere with the handle 17, even when the operation panel 14 stands up.

The scanner 10 includes the panel hinge 18 pivotably supporting the operation panel 14. The panel hinge 18 is a torque hinge which, when receives a torque greater than a predetermined value, allows the operation panel 14 to pivot.

In the scanner 10 thus structured, the user is allowed to tilt down the operation panel 14 from the standing position independently from the document cover 13.

In the scanner 10, the document cover 13 includes the document tray 13 for supporting one or more documents, and the automatic document feeder 30 for feeding the documents from the document tray 13 to the document table 12. The operation panel 14 is entirely offset from the document tray 13 in the direction parallel to the pivot axis of the document cover 13.

In the scanner 10 thus structured, the document tray 31 and the operation panel 14 are laterally offset from each other. Thus, the operation panel 14 is unlikely to interfere with the user in setting documents on the document tray 31.

In the scanner 10, the operation panel 14 is mounted to the housing 11.

In the scanner 10 thus structured, the operation panel 14 is unlikely to interfere with the user in taking out a discharged sheet from the sheet discharge tray 22 because the space X is defined blow the scanner 10 and the sheet discharge tray 22 is formed on an upper surface of the printer 20.

The scanner 10 includes the controller 50 for controlling action of the scanner 10, and the limit switch 51 for detecting whether the document cover 13 is in the open position Q. When the limit switch 51 detects that the document cover 13 is in the open position Q, the controller 50 disables input from the operation panel 14.

In the scanner 10 thus structured, the controller 50 inhibits input from the operation panel 14 when the document cover 13 is in the open position Q, because it is assumed in this case that the user is setting a document. This structure prevents or reduces malfunctions due to the user's unintentional touch, during document setting, on the operation panel 14.

The multifunction device 1 in the above-described embodiment has advantageous effects described below.

The multifunction device 1 includes the scanner 10, the printer 20 disposed below the scanner 10 to define a space therebetween and including the sheet discharge tray 22 on an upper surface of the printer 20. The operation panel 14 is disposed above the sheet discharge tray 22.

In the multifunction device 1 including the scanner 10 with the operation panel 14, and the printer 20. The opeation panel 14 is disposed entirely above the printer 20. This ensures easy access to a discharged sheet on the sheet discharge tray 22 of the printer 20.

While the disclosure has been described in detail with reference to the specific embodiments, various changes, arrangements and modifications may be applied therein without departing from the spirit and scope of the disclosure.

What is claimed is:

1. A scanner comprising:
   a document table;
   a housing covering a side surface of the document table;
   a document cover pivotable about a pivot axis between a closed position to cover the document table and an open position to expose the document table;
   an operation panel through which operational commands are input and which is movable between a first position and a second position lower than the first position, the operation panel in the first position overlapping with the document cover in the closed position when viewed in a perpendicular direction to the pivot axis of the document cover, and the document cover being away from the operation panel in the perpendicular direction; and
   a moving mechanism configured to move the operation panel to the second position in response to pivoting of the document cover to the open position, and to move the operation panel to the first position in response to the pivoting of the document cover to the closed position.

2. The scanner according to claim 1, wherein the document cover includes a handle with which the document cover is opened and closed, and the operation panel is entirely offset from the handle in a parallel direction to the pivot axis of the document cover.

3. The scanner according to claim 1, further comprising a hinge configured to pivotably support the operation panel, the hinge being a torque hinge configured to, when the torque hinge receives a torque greater than a predetermined value, allow the operation panel to pivot.

4. The scanner according to claim 1, further comprising a document tray configured to support a document; and
   an automatic document feeder configured to feed the document from the document tray to the document table,
   wherein the document tray and the automatic document feeder are disposed on the document cover, and the operation panel is entirely offset from the document tray in a parallel direction to the pivot axis of the document cover.

5. The scanner according to claim 1, wherein the operation panel is mounted to the housing.

6. The scanner according to claim 1, further comprising a controller configured to control action of the scanner; and
   a detector configured to detect whether the document cover is in the open position,
   wherein the controller is configured to, when the detector detects that the document cover is in the open position, disable input from the operation panel.

7. The scanner according to claim 1, wherein the operation panel is pivotable between the first position and the second position about a pivot axis parallel to the pivot axis of the document cover.

8. The scanner according to claim 1, wherein the document cover includes an arm and the operation panel includes an arm, and
   wherein the moving mechanism includes a link member connected at one end thereof to the arm of the document cover such that the link member and the arm of the document cover pivot relative to each other, and connected at the other end thereof to the arm of the operation panel such that the link member and the arm of the operation panel pivot relative to each other.

9. A multifunction device comprising:
   the scanner according to claim 1; and
   a printer disposed below the scanner to define a space therebetween, the printer including a sheet discharge tray disposed on an upper surface of the printer,
   wherein the operation panel is disposed above the sheet discharge tray.

10. A scanner comprising:
    a document table;
    a document cover located above the document table, the document cover being pivotable about a pivot axis between a closed position and an open position;
    an operation panel movable between a first position and a second position, the second position being lower than the first position; and
    a moving mechanism connected to the document cover and the operation panel, wherein pivoting the document cover from the closed position to the open position causes the moving mechanism to move the operation panel from the second position to the first position.

11. The scanner according to claim 10, further comprising a panel hinge attached to the operation panel,
   wherein the moving mechanism is connected to the document cover and the operation panel via the panel hinge.

12. The scanner according to claim 11, wherein the document cover further includes an arm,
   wherein the panel hinge further includes an arm, and
   wherein the moving mechanism is connected to the document cover and the operation panel via the arm of the document cover and the arm of the panel hinge.

13. The scanner according to claim 12, wherein the moving mechanism further includes a link, a first shaft at one end of the link, and a second shaft at the other end of the link,
   wherein the arm of the document cover is connected to the first shaft, and wherein the arm of the panel hinge is connected to the second shaft.

14. The scanner according to claim 11, wherein the panel hinge is a torque hinge configured to allow the operational panel to pivot when the torque hinge receives a particular torque.

15. The scanner according to claim 10, wherein the document cover includes a handle, and
   wherein the operation panel is entirely offset from the handle in a parallel direction with respect to the pivot axis of the document cover.

16. The scanner according to claim 10, further comprising an automatic document feeder including a document tray, the document tray being configured to support a document,
   wherein the automatic document feeder is disposed over the document cover, and
   wherein the operation panel is entirely offset from the document tray in a parallel direction to the pivot axis of the document cover.

* * * * *